(12) United States Patent
Smith et al.

(10) Patent No.: US 8,343,380 B2
(45) Date of Patent: Jan. 1, 2013

(54) CORROSION INHIBITION OF HYPOCHLORITE SOLUTIONS USING SUGAR ACIDS AND CA

(75) Inventors: Kim R. Smith, Woodbury, MN (US); Erik C. Olson, Savage, MN (US); Steven E. Lentsch, St. Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 13/292,598

(22) Filed: Nov. 9, 2011

(65) Prior Publication Data
US 2012/0156313 A1 Jun. 21, 2012

Related U.S. Application Data

(62) Division of application No. 12/974,520, filed on Dec. 21, 2010, now Pat. No. 8,114,344.

(51) Int. Cl.
*C23F 11/12* (2006.01)
*C23F 11/173* (2006.01)
*C23F 11/18* (2006.01)
*C23F 11/06* (2006.01)
*C01B 11/06* (2006.01)

(52) U.S. Cl. ......... 252/389.61; 252/389.52; 252/389.62; 252/396; 252/400.61; 252/400.62; 252/407; 252/187.24; 252/187.25; 252/187.26; 252/187.27; 252/187.28; 252/187.29; 252/187.3; 422/7

(58) Field of Classification Search . 422/7; 252/389.52, 252/389.61, 389.62, 396, 400.52, 400.61, 252/400.62, 407, 187.24, 187.25, 187.26, 252/187.27, 187.28, 187.29, 187.3
See application file for complete search history.

(56) References Cited

U.S. PATENT DOCUMENTS

| | | | |
|---|---|---|---|
| 2,121,501 A * | 6/1938 | Hershman | 424/665 |
| 3,740,187 A | 6/1973 | Kowalski | |
| 3,965,027 A | 6/1976 | Boffardi et al. | |
| 4,664,836 A * | 5/1987 | Taylor et al. | 510/196 |
| 5,047,168 A | 9/1991 | Broze et al. | |
| 5,104,584 A | 4/1992 | Kong | |
| 5,346,641 A | 9/1994 | Argo et al. | |
| 5,468,411 A | 11/1995 | Dixit et al. | |
| 5,750,070 A | 5/1998 | Tang et al. | |
| 5,776,874 A | 7/1998 | MacBeath et al. | |
| 5,783,540 A | 7/1998 | Secemski et al. | |
| 5,902,781 A | 5/1999 | Painter | |
| 5,912,218 A | 6/1999 | Chatterjee et al. | |
| 5,929,011 A | 7/1999 | Scepanski | |
| 5,967,157 A | 10/1999 | Chatterjee et al. | |
| 5,968,408 A | 10/1999 | Anderson et al. | |
| 6,093,343 A | 7/2000 | Addison et al. | |
| 6,616,739 B1 * | 9/2003 | Spanos | 106/14.44 |
| 6,863,830 B1 | 3/2005 | Purdy et al. | |
| 7,041,628 B2 | 5/2006 | Sunder et al. | |
| 7,709,434 B2 | 5/2010 | Smith et al. | |
| 7,741,262 B2 | 6/2010 | Smith et al. | |
| 2003/0220214 A1 | 11/2003 | Ofosu-Asante et al. | |
| 2004/0235680 A1 | 11/2004 | Lawrence et al. | |
| 2006/0116309 A1 | 6/2006 | Lambotte et al. | |
| 2008/0108537 A1 | 5/2008 | Rees | |
| 2008/0274930 A1 * | 11/2008 | Smith et al. | 510/221 |
| 2008/0287334 A1 * | 11/2008 | Smith et al. | 510/220 |
| 2008/0287335 A1 | 11/2008 | Smith | |
| 2008/0300160 A1 | 12/2008 | Smith et al. | |
| 2009/0105111 A1 | 4/2009 | Stolte et al. | |
| 2009/0149363 A1 * | 6/2009 | Smith et al. | 510/161 |
| 2010/0173820 A1 | 7/2010 | Smith et al. | |

FOREIGN PATENT DOCUMENTS

| | | |
|---|---|---|
| EP | 0723006 A2 | 7/1996 |
| EP | 1348755 A3 | 5/2003 |
| GB | 1039966 | 8/1966 |
| WO | 9512652 A1 | 5/1995 |
| WO | 2005011760 A1 | 2/2005 |

OTHER PUBLICATIONS

"Corrosion Basics", An Introduction, An Official NACE Publication, 1984, Overview, Chapter 2—Basic Corrosion, pp. 23-45, and Chapter 7 "Inhibitors", pp. 127-146.
El-Maksoud, et al., "Electrochemical behaviour of low carbon steel in gluconate and tartarate solutions", Elsevier—Electrochimica Acta 2005, www.sciencedirect.com.

* cited by examiner

*Primary Examiner* — Joseph D Anthony
(74) *Attorney, Agent, or Firm* — McKee, Voorhees & Sease, P.L.C.

(57) ABSTRACT

Corrosion inhibitor compositions and methods of use are disclosed. Sugar acids and calcium corrosion inhibitors combined with hypochlorite sources provide use solutions for effective corrosion inhibition for metal surfaces.

14 Claims, No Drawings

CORROSION INHIBITION OF HYPOCHLORITE SOLUTIONS USING SUGAR ACIDS AND CA

CROSS-REFERENCE TO RELATED APPLICATIONS

This application is Divisional application of U.S. Ser. No. 12/974,520, now U.S. Pat. No. 8,114,344 issued Feb. 14, 2012, which is related to U.S. patent application Ser. No. 12/974,468 filed Dec. 21, 2010, now U.S. Pat. No. 8,114,343 issued Feb. 14, 2012, entitled Corrosion Inhibition of Hypochlorite Solutions Using Zn and Ca, and U.S. patent application Ser. No. 12/974,560 filed Dec. 21, 2010, now U.S. Pat. No. 8,105,531 issued Jan. 31, 2012, entitled Corrosion Inhibition of Hypochlorite Solutions Using Polyacrylate and Ca, filed concurrently herewith. The entire contents of these patent applications are hereby expressly incorporated herein by reference including, without limitation, the specification, claims, and abstract, as well as any figures, tables, or drawings thereof.

FIELD OF THE INVENTION

The invention relates to corrosion inhibitor compositions and methods of using the same. In particular, sugar acids and calcium compounds are used with hypochlorite sources and have the beneficial effect of corrosion inhibition of metal in contact with hypochlorite sources. The present compositions and methods employing the compositions reduce and/or eliminate the corrosive effects of hypochlorite on metal surfaces.

BACKGROUND OF THE INVENTION

Sodium hypochlorite solutions are commonly used and highly effective as bleaches and sanitizers for cleaning a variety of surfaces. However, sodium hypochlorite solutions are extremely corrosive to many treated surfaces, in particular, metal surfaces become highly corroded. Hypochlorite solutions corrode surfaces as a result of its composition of sodium hypochlorite, sodium chloride and often sodium hydroxide, each having distinct mechanisms of corrosion. Sodium hypochlorite is a strong oxidant causing metal corrosion through a redox attack. Sodium chloride attacks and penetrates the passivation layer of metals, resulting in pitting of the surface. In addition, sodium hydroxide is corrosive to metals as a result of formation of metal hydroxide. Additional descriptions of the mechanisms of corrosion are disclosed in Corrosion Basics, National Association of Corrosion Engineers, 1984.

It is an objective of the claimed invention to develop corrosion inhibitor compositions to simultaneously prevent all corrosive mechanisms of sodium hypochlorite solution on metal surfaces.

A further object of the claimed invention is a corrosion inhibitor composition capable of preventing metal corrosion caused by sodium hypochlorite solutions without adversely impacting the stability of the hypochlorite solution.

A further object of the invention is to provide methods for hypochlorite corrosion inhibition.

BRIEF SUMMARY OF THE INVENTION

Unexpectedly, the present invention provides compositions and methods of use that synergistically reduce corrosion of metal surfaces treated with hypochlorite bleach solutions.

An advantage of the invention is a corrosion inhibitor composition that simultaneously prevents the corrosive mechanisms of hypochlorite solutions on treated surfaces. It is an advantage of the present invention that the claimed methods and compositions prevent substrate corrosion caused by hypochlorite solutions without adversely impacting the stability of the hypochlorite solution.

Corrosion inhibitor compositions according to the invention may comprise a hypochlorite source and a corrosion inhibitor comprising a sugar acid compound and a water soluble calcium compound, wherein the pH of said composition is at least about 7. According to the invention, the hypochlorite source is a solution of sodium hypochlorite, sodium chloride and optionally sodium hydroxide. Preferably the hypochlorite solution is free of carbonate or bicarbonate anions. According to a further embodiment of the invention, the corrosion inhibitor composition has a neutral or alkaline pH.

The corrosion inhibitor according to the invention may be a sugar acid compound and a water soluble calcium salt. The corrosion inhibitor according to the invention may further be a sugar acid and/or its oxidation product or products and a water soluble calcium salt having a chloride or non-halide anion. According to the invention, the ratio of hypochlorite source to corrosion inhibitor is from about 10:1 to about 600:1. According to a further embodiment of the invention, the ratio of said sugar acid to said calcium salt is from about 6:1 to about 1:6.

The corrosion inhibitor according to the invention may be a sugar acid compound and the water soluble calcium salt may be calcium chloride or calcium sulfate. According to the invention, the polyacrylate compound and calcium salts do not contain bromide or iodide anions. According to the invention, the corrosion inhibiter is free of aluminum and magnesium ions.

The corrosion inhibitors according to the invention are preferably EPA approved inert material for antimicrobial formulations. In addition, the corrosion inhibitor according to the invention does not adversely impact the stability of the hypochlorite source.

According to an additional embodiment of the invention, the corrosion inhibitor compositions may comprise a hypochlorite source comprising sodium hypochlorite, sodium chloride and sodium hydroxide and about 0.01 to about 2 wt-% corrosion inhibitor comprising a sugar acid and a water soluble calcium salt, wherein the pH of said composition is at least about 7, the ratio of said hypochlorite source to corrosion inhibitor is from about 50:1 to about 200:1 and the ratio of said sugar acid to said calcium salt is from about 6:1 to about 1:6.

The corrosion inhibitor composition according to the invention may further have a ratio of sugar acid to calcium salt from about 4:1 to about 1:4. In addition, the corrosion inhibitor is preferably an EPA approved inert material for antimicrobial formulations and does not adversely impact the stability of the hypochlorite source. According to a further embodiment, the combined hypochlorite and corrosion inhibitor composition has a pH of at least 9.

A method for inhibiting corrosion of a surface contacted by a hypochlorite source is disclosed according to the invention and comprises adding a corrosion inhibitor to a hypochlorite source to form a corrosion inhibitor composition comprising a sugar acid and water soluble calcium salt, and contacting a surface with said corrosion inhibitor composition. The methods according to the invention simultaneously control corrosive mechanisms of sodium hypochlorite, sodium chloride, and sodium hydroxide of said hypochlorite source.

The methods for inhibiting corrosion of a surface are suitable for metal surfaces. According to the methods of the invention, a corrosion inhibitor is added to a hypochlorite source to provide a corrosion inhibiter concentration in the hypochlorite use solution from about 25 ppm to about 2000 ppm. According to a preferred embodiment, the methods according to the invention result in a surface loss of at least less than about 0.1% of its weight in the presence of said corrosion inhibitor composition. The methods according to the invention may further comprise the formation of a corrosion-inhibiting layer on a treated surface.

DETAILED DESCRIPTION OF THE PREFERRED EMBODIMENT

The embodiments of this invention are not limited to particular corrosion inhibitor compositions and methods of using the same, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

The term "hard surface," as used herein, includes surfaces including, for example, showers, sinks, toilets, bathtubs, countertops, windows, mirrors, transportation vehicles, floors, and the like.

The phrase "health care surface," as used herein, refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

The terms "hypochlorite," "hypochlorite solution," "sodium hypochlorite solution" and variations thereof, as used herein, refer to a mixture of sodium hypochlorite, sodium chloride, and optionally sodium hydroxide.

The term "instrument," as used herein, refers to the various medical or dental instruments or devices that can benefit from cleaning with a stabilized composition according to the present invention. The phrases "medical instrument", "dental instrument", "medical device", "dental device", "medical equipment", or "dental equipment" refer to instruments, devices, tools, appliances, apparatus, and equipment used in medicine or dentistry. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

The term "ware," as used herein, includes items such as eating and cooking utensils. As used herein, the term "ware washing" refers to washing, cleaning, or rinsing ware.

The term, "water soluble," as used herein, refers to a compound that can be dissolved in water at a concentration of more than about 1 wt-%. Alternatively, the terms "sparingly soluble" or "sparingly water soluble" refer to a compound that can be dissolved in water only to a concentration of about 0.1 to about 1.0 wt-%. The term "water insoluble" refers to a compound that can be dissolved in water only to a concentration of less than about 0.1 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Commercially-available corrosion inhibitors for non-metal surfaces, such as glass, often work by causing controlled precipitation of calcium salts and other hard water sources and/or preventing redeposition of hardness sources, in order to reduce etching and/or corrosion of treated surfaces. For example, calcium gluconate is a corrosion and/or etch inhibitor that may be combined with a magnesium, zinc and/or aluminum ion source. Further description of such etch and corrosion inhibition systems are disclosed in U.S. Pat. Nos. 7,709,434 and 7,759,299 and U.S. patent application Ser. Nos. 12/114,364, 12/114,342 and 12/726,179, the disclosures of which are herein incorporated in its entirety. Such corrosion inhibitor compositions have been found to provide suitable etch protection to glass and soft metal surfaces, such as aluminum, against corrosive attack by alkalinity in warewash detergents. Examples of additional corrosion, salt deposit and scale-inhibitor systems known in the art, include for example U.S. Pat. No. 3,965,027 the disclosure of which is herein incorporated in its entirety.

Unlike the present invention, prior corrosion inhibitor systems are not incorporated directly into the highly corrosive hypochlorite bleach formulas and solutions. Accordingly, the compositions according to the present invention provide the benefit of anticorrosive effects traditionally observed when metal surfaces are contacted with hypochlorite solutions at concentrations often as low as about 100 ppm. The corrosion inhibitor compositions according to the invention are suitable for use in any application where it is desirable to reduce surface corrosion caused by such hypochlorite solutions. The anticorrosive effects are obtained at a rate of corrosion of a treated surfaces that is less than the rate of corrosion for an otherwise identical use solution of hypochlorite except for the absence of the corrosion inhibitor according to the invention.

Although not limiting to the present invention, it is believed that, in certain embodiments, the combined use of a sugar acid and water soluble calcium salt according to the invention, provides a mechanism of synergistic corrosion inhibition. The calcium compound forms a microscopic protective film on the surface of articles exposed to the present corrosion inhibitor composition. The protective film can be transparent or not visible to the unaided eye and functions as a protective layer to slow or prevent the corrosive hypochlorite solutions components, namely sodium hypochlorite, sodium chloride and often sodium hydroxide, from attacking and corroding the surface of the article via the different corrosive mechanisms. According to a theory of the invention, the film may function to allow the corrosive hypochlorite solution to attack and remove portions of the film, rather than attack the surface of the article. The combined use of the sugar acid provides further mechanism of corrosion inhibition that acts in synergy with the calcium compound.

Corrosion Inhibitor Compositions

According to an embodiment of the invention, a corrosion inhibitor composition is disclosed and comprises, consists of and/or consists essentially of a hypochlorite source and a corrosion inhibitor comprising both a sugar acid and a calcium compound. The corrosion inhibitor package of a sugar acid and calcium compound exhibits excellent corrosion inhibition for metal surfaces in the presences of a hypochlorite source. The corrosion inhibitor package according to the invention may therefore be added to compositions, wherein hypochlorite sources are employed, to inhibit the corrosion of metal surfaces. The combination of the sugar acid and calcium compound generate synergistic increases in corrosion inhibition caused by hypochlorite sources, compared to corrosion inhibition obtained with the use of either a sugar acid or calcium compound alone.

The sugar acid and calcium compound according to the corrosion inhibitor compositions provide a source of calcium ions. Any water soluble calcium compound that provides calcium ions may be used according to the invention. The sources of calcium ions can be provided as elemental metals, organic salts, inorganic salts, organic oxides, inorganic oxides or mixtures thereof. The sources of calcium ions can further be provided as an anhydrous compound or as a hydrated component.

According to an embodiment of the invention, any sugar acid may be utilized and/or any oxidation product of a sugar acid. Sugar acids include monosaccharides with an —OH group oxidized to a carboxyl group. Exemplary sugar acids include aldonic acids, ulosonic acids, uronic acids and aldaric acids. As one skilled in the art will ascertain, aldonic acids are those sugar acids where the aldehyde functional group of an aldose is oxidized. Ulosonic acids are those sugar acids in which a keto-acid is formed via oxidation of the first hydroxyl of a 2-ketose is oxidized. Uronic acids are those sugar acids where an aldose's or ketose's first hydroxyl group is oxidized. Finally, aldaric acids are those sugar acids with both ends of an aldose oxidized.

Suitable sugar acids according to the invention include the following nonlimiting examples, including ascorbic acid, gluconic acid, galaturonic acid, mucic acid, and glucaric acid. Both ascorbic acid and gluconic acid are particularly suitable sugar acids for use in the corrosion inhibitor package. As one skilled in the art shall ascertain, ascorbic acid may be considered a "vinyl" carboxylic acid with the double bond's electrons shared between the hydroxyl and the carbonyl moieties. There are two resonance structures for the deprotonated form, differing in the position of the double bond. Ascorbic acid might also be considered an enol. The deprotonated form would then be a strongly basic enolate with the adjacent double bond stabilizing the deprotonated form.

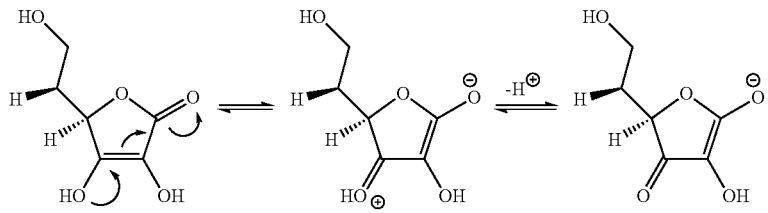

According to an embodiment of the invention, the sugar acid and calcium corrosion inhibitor package is preferably comprised of a sugar acid selected from the group consisting of ascorbic acid, gluconic acid, galaturonic acid, mucic acid, and glucaric acid and a water soluble calcium salt. The sugar acid and water soluble calcium salt are sufficiently water-soluble so that when the composition is combined with a diluent, such as water, the compounds dissolve. In this context, sufficiently water-soluble means that the salts dissolve at a relatively quick rate in water. In an embodiment of the invention, the solubility of the water soluble zinc and calcium salts is at least about 0.5 wt-% in water at about 20° C. and atmospheric pressure. In an embodiment of the invention, the water soluble calcium and sugar acid remain soluble in solution. In a further embodiment, the water soluble calcium and sugar acid remain dispersed in solution.

According to an embodiment of the invention, the calcium salt of the corrosion inhibitor composition has a chloride or non-halide anion. According to a preferred embodiment, the calcium salt does not contain bromide or iodide anions. Although not intending to be limited according to a particular theory of the invention, a corrosion inhibitor composition with non-halide anions, particularly not containing bromide or iodide anions, avoids conversion of the ions into hypobromite and/or hypoiodite oxidants through the in situ reaction of the bromide and iodide with the hypochlorite. According to a further embodiment of the invention, the zinc and calcium salts of the corrosion inhibiter are free of aluminum and magnesium ions.

Suitable water soluble calcium salts according to the invention are not effective as oxidizing agents or reducing agents. In addition, suitable water soluble calcium salts do not contain an anion that acts as a bleach catalyst. Still further, oxidizing halogens and/or their hypohalous acids are not desirable for use according to the invention. Calcium salts may include, for example, calcium acetate, calcium benzoate, calcium chlorate, calcium chloride, calcium dihydrogen phosphate, calcium formate, calcium gluconate, calcium glycerophosphate, calcium lactate, calcium metasilicate, calcium nitrate, calcium pantothenate, calcium phosphate, calcium salicylate, calcium succinate, calcium sulfate, a hydrate thereof, and a mixtures thereof or the like. The salts can be provided as hydrated salts or anhydrous salts. Exceptionally suitable calcium salts for the corrosion inhibitor composition include calcium chloride and calcium sulfate.

According to an embodiment of the invention the corrosion inhibitor compositions comprise low levels of corrosion-inhibiting additives. According to a preferred embodiment the corrosion inhibitor compositions comprise ingredients on the U.S. Environmental Protection Agency (EPA) Inert Ingredient List for antimicrobial formulations.

According to the invention, a variety of hypochlorite sources may be utilized. The corrosion inhibitor is preferably a bleach hypochlorite solution. The hypochlorite source according to the invention includes sodium hypochlorite and sodium chloride. The hypochlorite source may further optionally include sodium hydroxide. A commercially-available hypochlorite source is XY-12, available from Ecolab, Inc. and provides a concentrated bleach hypochlorite suitable for use according to the invention. Preferably the hypochlorite solution is free of carbonate or bicarbonate anions.

The corrosion inhibitor compositions according to the invention have a suitable ratio of a hypochlorite source to corrosion inhibitor from about 10:1 to about 600:1. According to the invention, the level of corrosion inhibitor in a hypochlorite solution varies with the particular ratio of sugar acid to calcium utilized for the corrosion inhibitor package. Particularly suitable ratios of hypochlorite source to corrosion inhibitor are from about 50:1 to about 200:1, from about 40:1 to about 150:1, from about 30:1 to about 100:1, from about 20:1 to about 50:1, and from about 10:1 to about 1:1.

The corrosion inhibitor composition can include a corrosion inhibitor package, comprising a sugar acid and calcium compound, in an amount from about 0.01 wt-% to about 50 wt-%, preferably about 0.01 wt-% to about 20 wt-%, more preferably from about 0.1 wt-% to about 10 wt-% and most preferably from about 0.1 wt-% to about 2 wt-%. The corrosion inhibitor composition includes an effective amount of the corrosion inhibitor package comprising the sugar acid and calcium compounds in order to provide a use solution inhibiting corrosion of metal surfaces contacted with hypochlorite sources. The phrase "effective amount" in reference to the corrosion inhibitors refers to an amount sufficient to provide a use corrosion inhibitor composition that inhibits surface corrosion compared with a composition that is identical except that it does not contain a sufficient amount of the corrosion inhibitor to reduce surface corrosion after contact with a hypochlorite source. According to a preferred embodiment, the sufficient amount of corrosion inhibitor does not adversely impact the stability of the hypochlorite source.

The corrosion inhibitor composition according to the invention further has a suitable ratio of a sugar acid to calcium compound. According to an embodiment of the invention, a suitable ratio of a sugar acid to a calcium salt for the corrosion inhibitor package is from about 6:1 to about 1:6. Particularly suitable ratios of said sugar acid to the calcium salt are from about 4:1 to about 1:4. The ratio of the sugar acid to calcium salt for the corrosion inhibitor package may be controlled to provide reduced corrosion of treated metal surfaces compared with the use of either component alone. According to the invention, the combined use of a sugar acid and calcium compound, namely water soluble calcium and sugar acid, can provide a synergy in the reduction of metal corrosion caused by a hypochlorite source.

The corrosion inhibitor composition generally includes a use solution that has a non-acidic pH. The pH suitable for use with the corrosion inhibitor composition may be either neutral or alkaline. As used herein, basic or alkaline pH refers to pH greater than 7, greater than or equal to 8, about 8 to about 9.5, about 8 to about 11, greater than about 9, or about 9 to about 10.5. According to the invention, a preferred use solution pH to provide a corrosion-inhibited hypochlorite bleach source is from about pH 7 to about pH 9, more preferably from about pH 7 to about pH 8.

Use Compositions

The present corrosion inhibitor composition or a composition containing the corrosion inhibitors can be provided in the form of a concentrate or a use solution. In general, a concentrate refers to a composition that is intended to be diluted with water to provide a use solution that contacts an object to provide the desired corrosion inhibition according to the invention. A use solution may be prepared from the concentrate by diluting the concentrate with water at a dilution ratio that provides a use solution having desired corrosion inhibition properties. In general, the corrosion inhibitor composition that contacts the articles to be protected from hypochlorite corrosion can be referred to as a use composition.

In an exemplary embodiment, a concentrate composition may be diluted at a weight ratio of diluent to concentrate of at least about 1:1 or about 1:1 to about 2000:1.

The use solution of a corrosion inhibitor composition will include at least about 25 parts per million (ppm) of the corrosion inhibitor to provide desired corrosion inhibition properties. Larger amounts of corrosion inhibitor can be used in the use solution without deleterious effects. Embodiments of the use solution of a corrosion inhibitor composition according to the invention can include from about 25 ppm to about 3000 ppm of the corrosion inhibitor, or about 50 ppm to about 2000 ppm of the corrosion inhibitor. The amount of corrosion inhibitor is calculated based upon the combined amount of sugar acid and calcium compound used according to the invention.

The concentrate may be diluted with water at the location of use to provide the use solution. When the corrosion inhibitor composition is used in an automatic warewashing or other machine, it is expected that the location of use will be inside the automatic machine. For example, when the corrosion inhibitor composition is used in a warewashing machine, depending on the machine, the hypochlorite source (i.e. bleach or sanitizer) may be provided in a unit dose form or in a multi-use form. In larger warewashing machines, a large quantity of corrosion inhibitor composition may be provided in a compartment that allows for the release of a single dose amount of the composition for each cycle. Such a compartment may be provided as part of the warewashing machine or as a separate structure connected to the warewashing machine.

Additional Agents for Corrosion Inhibitor Compositions

Corrosion inhibitor compositions made according to the invention may further include additional functional agents or additives that provide a beneficial property. For example, additional agents or additives may be selected from the group consisting of pH adjusters or other neutralizing agents, surfactants, emulsifiers, sequestrants, solubilizers, other lubricants, buffers, detergents, cleaning agent, rinse aid composition, secondary anti-corrosion agent, preservatives, binders, thickeners or other viscosity modifiers, processing aids, carriers, water-conditioning agents, foam inhibitors or foam generators, threshold agent or system, aesthetic enhancing agent (i.e., dye, odorant, perfume), other agents or additives suitable for formulation with a corrosion inhibitor composition and the like, and mixtures thereof. Additional agents or additives will vary according to the particular corrosion inhibitor composition being manufactured and its intend use as one skilled in the art will appreciate based on the enabling disclosure of the present invention.

According to an additional embodiment of the invention, the corrosion inhibitor compositions do not contain any of the additional agents. Alternatively, a corrosion inhibitor composition according to the invention only contains hypochlorite-compatible additional agents, for example, surfactants, viscosity modifiers and fragrances. Preferably, the corrosion inhibitor composition does not contain the additional agents commercially-available in common detergent compositions.

Dispensing of the Corrosion Inhibitor Compositions

The corrosion inhibitor compositions according to the present invention can be dispensed in any suitable method generally known by one skilled in the art. For example, spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. A spray-type dispenser functions by impinging a water spray upon an exposed surface of the solid composition to dissolve a portion of the composition, and then immediately directing the concentrate solution including the composition out of the dispenser to a storage reservoir or directly to a point of use.

In an embodiment, the present corrosion inhibitor composition can be dispensed by immersing either intermittently or continuously in water. The composition can then dissolve, for example, at a controlled or predetermined rate. The rate can be effective to maintain a concentration of dissolved cleaning agent that is effective for use according to the methods of the claimed invention.

In an embodiment, the present corrosion inhibitor composition can be dispensed by scraping solid from the solid composition and contacting the scrapings with water. The scrapings can be added to water to provide a concentration of dissolved corrosion inhibitor that is effective for use according to the methods of the claimed invention.

Methods of Use for Corrosion Inhibitors

The methods for corrosion inhibition according to the invention protect surfaces in contact with hypochlorite sources from corrosion caused by hypochlorite bleach used for a variety of surfaces and antimicrobial treatments. Methods for corrosion inhibition according to the invention may comprise, consist of and/or consist essentially of contacting a surface with a corrosion inhibitor composition, wherein said corrosion inhibitor composition comprises a hypochlorite source and a sugar acid and calcium compound. The corrosion inhibitor compositions provide an inhibited hypochlorite solution that can be used as a bleach or surface antimicrobial agent in a variety of applications. One skilled in the art will appreciate and know various application methods.

In an embodiment, the methods of the invention relate to a method employing the corrosion inhibitor composition. The method can include providing the corrosion inhibitor composition to a surface treated with a hypochlorite solution in order to inhibit corrosion caused by the hypochlorite solution. The method can include preparing an aqueous use composition of the present corrosion inhibitor composition. The method may further include contacting a surface, such as a hard metal surface, in need of corrosion inhibition due to contact with a hypochlorite solution.

A variety of suitable surfaces may be contacted with the corrosion inhibitor composition according to the invention. Particularly suitable surfaces for treatment with the corrosion inhibitor compositions according to the invention include metallic and metal-containing surfaces, including steel, rolled steel and stainless steel.

Surfaces may be contacted according to the methods of the present invention for use as a hard surface cleaner or sanitizer, including for example, industrial surfaces, food and beverage surfaces, food service and restaurant surfaces, and health care surfaces. According to an embodiment of the invention, it is desirable to use the corrosion inhibitor compositions and the claimed methods of use to inhibit the corrosion of metal surfaces contacted with hypochlorite used as a hard surface sanitizer in janitorial and/or housekeeping applications and food processing equipment and/or plant applications and in laundry applications. For example, the corrosion of washers, such as tunnel washers for washing textiles, may be inhibited according to methods of the claimed invention.

In addition, surfaces may be contacted according to the methods of the present invention for use in low temperature dish and/or warewash sanitizing final rinse, toilet bowl cleaners, and laundry bleaches. According to further embodiments, the corrosion inhibitor compositions and the claimed methods are used as sanitizers for pools, spas, and hot tubs. According to further embodiments of the invention, the methods are used to treat metal surfaces, such as ware, cleaned and/or sanitized with corrosive hypochlorite sources.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

A corrosion test applied hypochlorite solutions to 304 stainless steel coupons for three days at 120° F. The commercially-available concentrated hypochlorite bleach product XY-12 (Ecolab, Inc.), containing 12% sodium hypochlorite and a use solution of the bleach product diluted to 100 ppm hypochlorite were applied to the stainless steel coupons. Both hypochlorite solutions caused heavily discolored (dark brown) coupons. In addition, the stainless steel coupons treated with the concentrated bleach/hypochlorite solution showed further corrosion signs of pitting and rust.

Example 2

Comparison of corrosive effects of hypochlorite solutions with corrosion inhibitor compositions. The weight loss of the coupons was determined, with higher weight loss corresponding to loss of metal due to corrosion. The commercially-available concentrated bleach product was modified to contain ascorbic acid. The ascorbic acid was tested for anticorrosion efficacy alone, in combination with calcium chloride and compared to calcium chloride alone. Formulations for the various tests are shown in Table 1 below.

TABLE 1

| Corrosion Inhibition Test System | | | | % Wt |
|---|---|---|---|---|
| Component 1 | ppm | Component 2 | ppm | Loss |
| Ascorbic acid | 1 | — | — | 0.075 |
| Ascorbic acid | 5 | — | — | 0.075 |
| Ascorbic acid | 50 | — | — | 0.081 |
| Ascorbic acid | 200 | — | — | 0.071 |
| Ascorbic acid | 1 | Ca chloride | 50 | 0.061 |
| Ascorbic acid | 5 | Ca chloride | 50 | 0.050 |
| Ascorbic acid | 50 | Ca chloride | 50 | 0.044 |
| Ascorbic acid | 200 | Ca chloride | 50 | 0.046 |
| Ca chloride | 1 | — | — | 0.078 |
| Ca chloride | 5 | — | — | 0.073 |
| Ca chloride | 50 | — | — | 0.073 |
| Ca chloride | 200 | — | — | 0.074 |
| — | — | — | — | 0.070 |

The commercially available hypochlorite solution of Example 1 was diluted to 100 ppm hypochlorite and further modified according to the corrosion inhibition test systems described in Table 1. Non-significant, very slight discoloration of the stainless steel coupon at the air/liquid interact was obtained after three days at 120° F. No pitting and/or rusting corrosion was obtained.

The combination of sugar acid (ascorbic acid) and calcium chloride showed synergistic reduction in the attack of hypochlorite on stainless steel surfaces. Synergy was determined from the data obtained from designed experiments and an analysis specifically focused on finding synergy. The synergy and rations of ingredients of a corrosion inhibitor package that achieve such synergy are described further herein below. The results were unexpected as a result of the use of the ascorbic acid with the hypochlorite solution showed some accelerated attack of hypochlorite on the steel surfaces. In addition, the calcium by itself did not show any efficacy for corrosion inhibition of hypochlorite solutions.

The corrosion inhibition packages according to the invention provide simultaneous control of all corrosive mechanisms of sodium hypochlorite, sodium chloride, and sodium hydroxide (or any combination of the same that may be found in a bleach or hypochlorite source). The corrosion inhibition does not result in any inhibition, inactivation or other modification to the stability of the hypochlorite source, as may be readily measured by one skilled in the art to which the invention pertains.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A corrosion inhibitor composition comprising:
    a hypochlorite source; and
    a corrosion inhibitor comprising a sugar acid and a non-oxidizing water soluble calcium compound, wherein said corrosion inhibitor is free of magnesium salt, wherein the ratio of said hypochlorite source to corrosion inhibitor is from about 10:1 to about 600:1, wherein the ratio of said sugar acid to said calcium salt is from about 6:1 to about 1:6, and wherein the pH of said composition is at least about 7.

2. The composition according to claim 1, wherein said hypochlorite source is a solution of sodium hypochlorite, wherein said hypochlorite source is free of carbonate and bicarbonate anions.

3. The composition according to claim 1, wherein said sugar acid is selected from the group consisting of aldonic acids, ulosonic acids, uronic acids and aldaric acids, and said calcium compound is a water soluble calcium salt with a chloride or non-halide anion.

4. The composition according to claim 1, wherein the ratio of said hypochlorite source to corrosion inhibitor is from about 50:1 to about 200:1.

5. The composition according to claim 1, wherein the ratio of said sugar acid to said calcium salt is from about 4:1 to about 1:4.

6. The composition according to claim 3, wherein said sugar acid is ascorbic acid, gluconic acid, galaturonic acid, mucic acid or glucaric acid and said calcium salt is calcium chloride or calcium sulfate.

7. The composition according to claim 3, wherein said calcium salt does not contain bromide, iodide, aluminum or magnesium.

8. The composition according to claim 1, wherein said corrosion inhibitor is an EPA approved inert material for antimicrobial formulations and does not adversely impact the stability of the hypochlorite source.

9. The composition according to claim 1, wherein said corrosion inhibitor composition has a neutral or alkaline pH.

10. A corrosion inhibitor composition comprising:
    a hypochlorite source comprising sodium hypochlorite, sodium chloride and sodium hydroxide, wherein said hypochlorite source is free of carbonate and bicarbonate anions; and
    about 0.01 to about 2 wt-% corrosion inhibitor comprising a sugar acid and a non-oxidizing water soluble calcium salt, wherein the pH of said composition is at least about 7, wherein said corrosion inhibitor is free of magnesium salt, and wherein the ratio of said hypochlorite source to corrosion inhibitor is from about 40:1 to about 150:1 and the ratio of said sugar acid to said calcium salt is from about 6:1 to about 1:6.

11. The composition according to claim 10, wherein the ratio of said sugar acid to said calcium salt is from about 4:1 to about 1:4.

12. The composition according to claim 10, wherein said corrosion inhibitor is an EPA approved inert material for antimicrobial formulations and does not adversely impact the stability of the hypochlorite source.

13. The composition according to claim 10, wherein said corrosion inhibitor composition has a pH of at least 9.

14. The composition according to claim 2, wherein said hypochlorite source further comprises sodium chloride, sodium hydroxide or combinations of the same.

* * * * *